United States Patent
Xia et al.

(10) Patent No.: US 10,854,874 B2
(45) Date of Patent: Dec. 1, 2020

(54) LITHIUM METAL OXIDE CATHODE POWDERS FOR HIGH VOLTAGE LITHIUM-ION BATTERIES

(71) Applicants: Umicore, Brussels (BE); Umicore Korea Ltd., Chungnam (KR)

(72) Inventors: Xin Xia, Cheonan (KR); Jens Paulsen, Daejeon (KR); Shinichi Kumakura, Kobe (JP); Song-Yi Han, Daejeon (KR)

(73) Assignees: Umicore, Brussels (BE); Umicore Korea Ltd., Chungnam (KR)

( * ) Notice: Subject to any disclaimer, the term of this patent is extended or adjusted under 35 U.S.C. 154(b) by 167 days.

(21) Appl. No.: 15/545,348

(22) PCT Filed: Jan. 20, 2016

(86) PCT No.: PCT/IB2016/050262
§ 371 (c)(1),
(2) Date: Jul. 21, 2017

(87) PCT Pub. No.: WO2016/116867
PCT Pub. Date: Jul. 28, 2016

(65) Prior Publication Data
US 2018/0034045 A1    Feb. 1, 2018

(30) Foreign Application Priority Data
Jan. 23, 2015 (EP) .................................. 15152336

(51) Int. Cl.
*H01M 4/36* (2006.01)
*H01M 4/525* (2010.01)
(Continued)

(52) U.S. Cl.
CPC ......... *H01M 4/366* (2013.01); *H01M 4/0471* (2013.01); *H01M 4/131* (2013.01);
(Continued)

(58) Field of Classification Search
CPC ........... H01M 4/131; H01M 4/36–366; H01M 4/48–525; H01M 4/0471; H01M 4/1391; H01M 4/366; H01M 4/505; C01G 53/50
(Continued)

(56) References Cited

U.S. PATENT DOCUMENTS 7,883,644 B2   2/2011  Paulsen
2006/0233696 A1 10/2006 Paulsen
(Continued)

FOREIGN PATENT DOCUMENTS

CN    101405899 A    4/2009
CN    102612775 A    7/2012
(Continued)

OTHER PUBLICATIONS

European Search Report for EP15152336, dated Apr. 27, 2015.
(Continued)

*Primary Examiner* — James M Erwin
(74) *Attorney, Agent, or Firm* — NK Patent Law

(57) ABSTRACT

This invention discloses a lithium metal oxide powder for a cathode material in a rechargeable battery, consisting of a core and a surface layer, the core having a layered crystal structure comprising the elements Li, M and oxygen, wherein M has the formula $M=(Ni_z(Ni_{1/2}Mn_{1/2})_yCo_x)_{1-k}A_k$, with $0.15 \leq x \leq 0.30$, $0.20 \leq z \leq 0.55$, $x+y+z=1$ and $0 \leq k \leq 0.1$, wherein A is a dopant, wherein the Li content is stoichiometrically controlled with a molar ratio $0.95 \leq Li:M \leq 1.10$; and wherein the surface layer comprises the elements Li, M' and oxygen, wherein M' has the formula $M'=(Ni_{z'}(Ni_{1/2}Mn_{1/2})_{y'}Co_{x'})_{1-k'}A_{k'}$, with $x'+y'+z'=1$ and $0 \leq k' \leq 0.1$, and wherein $y'/(y'+2z') \geq 1.1*[y/(y+2z)]$. The surface layer may also comprise at least 3 mol % Al, the Al content in the surface layer 10 being determined by XPS.

20 Claims, 6 Drawing Sheets

(51) Int. Cl.
H01M 4/1391 (2010.01)
H01M 4/04 (2006.01)
H01M 4/131 (2010.01)
H01M 4/505 (2010.01)
H01M 10/0525 (2010.01)
H01M 4/02 (2006.01)
C01G 53/00 (2006.01)

(52) U.S. Cl.
CPC ......... *H01M 4/1391* (2013.01); *H01M 4/505* (2013.01); *H01M 4/525* (2013.01); *C01G 53/50* (2013.01); *C01P 2002/54* (2013.01); *C01P 2002/80* (2013.01); *C01P 2004/84* (2013.01); *C01P 2006/40* (2013.01); *H01M 10/0525* (2013.01); *H01M 2004/021* (2013.01); *H01M 2004/028* (2013.01)

(58) Field of Classification Search
USPC ....................................................... 429/223
See application file for complete search history.

(56) References Cited

U.S. PATENT DOCUMENTS

| | | | |
|---|---|---|---|
| 2007/0292761 | A1 | 12/2007 | Park |
| 2008/0138708 | A1 | 6/2008 | Watanabe et al. |
| 2008/0311473 | A1 | 12/2008 | Sasaoka et al. |
| 2013/0175469 | A1 | 7/2013 | Paulsen |
| 2013/0202966 | A1 | 8/2013 | Yu |
| 2014/0054495 | A1 | 2/2014 | Paulsen |
| 2016/0013486 | A1* | 1/2016 | Hirai ................ H01M 2/16 429/223 |

FOREIGN PATENT DOCUMENTS

| | | | | |
|---|---|---|---|---|
| CN | 103081189 | A | 5/2013 | |
| EP | 2698351 | A1 | 2/2014 | |
| EP | 2851988 | A1 | 3/2015 | |
| JP | 4062169 | B2 | 3/2008 | |
| JP | 2008204806 | A | 9/2008 | |
| JP | 2013020984 | A | 1/2013 | |
| WO | 2006065605 | A2 | 6/2006 | |
| WO | 2013189109 | A1 | 12/2013 | |
| WO | 2014021665 | A1 | 2/2014 | |
| WO | 2012108513 | A1 | 7/2014 | |
| WO | WO-2014133069 | A1 * | 9/2014 | ............. H01M 2/16 |
| WO | 2015001631 | A1 | 1/2015 | |

OTHER PUBLICATIONS

Sun, Y.K., et al. "High-energy Cathode Material for Long-Life and Safe Lithium Batteries", Nature Materials, vol. 8, No. 44 (Mar. 22, 2009), pp. 320-324.

Hou, P. et al, "Design, Preparation and Properties of Core-Shelled Li [NiyCo1-2MNy](1-x)]core[Ni1/2Mn1/2]x) shellO2 (0<=x<=0.3, 6y+3x-6xy=2) as High Performance Cathode for Li-Ion Battery", Electrochimica Acta, vol. 133, (Jul. 1, 2014), pp. 589-596.

Wei, Quiliang. et al., Spherical Concentration-Gradient LiMn1.87Ni0.13O4 Spinel as a High Performance Cathode for Lithium Ion Batteries, Journal of Material Chemistry A, Jan. 29, 2013, pp. 4010-4016, vol. 1.

EPO, Supplementary European Search Report for European Patent No. 16739857, dated Oct. 9, 2018.

International Search Report for PCT/IB2016/050257, dated May 12, 2016.

Martha, S.K., et al., "A short review on surface chemical aspects of Li batteries: A key for a good performance", Journal of Power Sources, vol. 189 (2009), pp. 288-296.

Amine, K., et al., "Mechanism of capacity fade of MCMB/Li1.1[Ni1/3Mn1/3Co1/3]0.9O2 cell at elevated temperature and additives to improve its cycle life", J. Mater. Chem., vol. 21 (2011), pp. 17754-17759.

Etacheri et al., "Challenges in the development of advanced Li-ion batteries: A review" Energy & Environmental Science, vol. 4, No. 9, (2011), pp. 3243-3262.

Sun, Y.K., et al., "Microscale core-shell structured Li[Ni0.8Co0.1Mn0.1]0.8(Ni0.5Mn0.5)0.2]O2 as positive electrode material for lithium batteries", Electrochemical and Solid-State Letters, vol. 9, No. 3 (2006), pp. A171-A174.

Lee, E.J., et al., "Effect of outer layer thickness on full concentration gradient layered cathode material for lithium-ion batteries", Journal of Power Sources, vol. 273, (2015) pp. 663-669.

Yoon, S.J., et al., "Improved performances of Li[Ni0.65Co0.08Mn0.27]O2 cathode material with full concentration gradient for Li-ion batteries", Journal of the Electrochemical Society, vol. 162, No. 2 (2015), pp. A3059-A3063.

Zhang, Z., et al., "Fluorinated electrolytes for 5 V lithium-ion battery chemistry", Energy and Environmental Science, vol. 6 (2013), pp. 1806-1810.

Zhan, C., et al., "Mn(II) deposition in anodes and its effects on capacity fade in spinel lithium manganate-carbon systems", Nature Communication, vol. 4 (2013), p. 2437.

* cited by examiner

LITHIUM METAL OXIDE CATHODE POWDERS FOR HIGH VOLTAGE LITHIUM-ION BATTERIES

This application is a National Stage application of International Application No. PCT/IB2016/050262, filed Jan. 20, 2016. This application also claims priority to European Application No. EP15152336.2, filed Jan. 23, 2015.

TECHNICAL FIELD AND BACKGROUND

This invention relates to NMC based cathode materials for a lithium secondary battery. NMC is the abbreviation for $LiMO_2$, with $M=Ni_{1-x-y}Mn_xCo_y$. The cathode material contains Ni, Mn and Co, is surface treated and has a modified composition which shows improved cycle stability during long term cycling in full cells, especially at high charge cut-off voltage ($\geq 4.35V$), at both room and elevated temperatures.

Lithium secondary batteries have been recently developed as a power source in many applications due to their high energy density, mainly in the area of portable electronic devices and automotive applications, including EV (electric vehicles), HEV (hybrid electric vehicles) and PHEV (plug-in hybrid electric vehicles). A lithium-ion battery generates electric energy based on the reversible intercalation/deintercalation of lithium-ions into/from a positive and negative electrode material. LCO—abbreviation for $LiCoO_2$—was previously the dominating positive electrode material for the rechargeable lithium-ion battery. Recently, NMC cathode material has been developed as an alternative, since its fabrication cost is lower than LCO. NMC has an ordered rocksalt structure with space group R-3M, where the cations order into 2-dimensional Li and M layers. There are many possible compositions, often categorized and named after their nickel, manganese and cobalt content. Typical NMC compositions are "111" where $M=Ni_{1/3}Mn_{1/3}Co_{1/3}$, "442" with $M=Ni_{0.4}Mn_{0.4}Co_{0.2}$, "532" with $M=Ni_{0.5}Mn_{0.3}Co_{0.2}$ and "622" with $M=Ni_{0.6}Mn_{0.2}Co_{0.2}$ etc. It is known that the gravimetric energy density of NMC is increasing with Ni content for a constant Li potential, for example, NMC622 has a higher gravimetric energy density than both NMC532 and NMC111, when charged to the same voltage.

Recently, due to the increase of the market, the requirement for improving the energy density of batteries is inevitable, not only for automotive application, but also for portable devices. Effective approaches may be: using NMC materials with a high Ni content, for example NMC622, and increasing the cycle voltage from currently 4.2V to 4.35V or even 4.4V.

Due to the low cost of NMC cathode material, it is quite attractive to replace some LCO by NMC in the portable electronics application. However, the complete replacement is not possible. A major reason is that the volumetric energy density of commercially successful NMC products, which are mainly NMC111 and NMC532, is lower compared to LCO. There are some advanced high voltage LCO products commercially available in the market, that can deliver a good cycle stability in full cells when cycled up to 4.35V or even 4.4V. Contrary to this, cycling of NMC in high voltage batteries has not been demonstrated commercially. Also, when charged to voltages higher than 4.2V full cells tend to bulge. In order to make NMC competitive with LCO concerning high energy density, a higher application voltage has to be used, for example, 4.35V or 4.4V, and NMC compositions should switch to higher Ni content, for example, from NMC111 to NMC622. Therefore, so-called "high Ni" NMC cathodes that are simple in design and that can be cycled stably at a high voltage are needed for the portable electronics application. It is the aim of this invention to supply NMC which can be cycled at high voltage with a good cycle stability without showing unacceptable bulging.

In the automotive applications, LCO cannot be used due to its high manufacturing cost related to the cost of Co, and an undesirable short battery life upon cycling, and there is a tendency to use more and more NMC. The requirements of batteries for automotive applications are stricter than those for portable electronics. A very long cycle life is mandatory, usually 80% capacity of the batteries should remain after 2000 cycles (at a 4.2V charge), using a full charge and discharge cycle. The high temperature cycle stability should be good, because batteries in automotive usually work at an elevated temperature. There are also very strict requirements for the other properties of the batteries, for example, calendar life, safety, etc. In order to increase the battery life, EV or HEV usually use a small voltage range, such as 3 to 4.1V, so that more batteries are required to supply enough power. This obviously increases the battery pack's cost. A solution to reduce cost is to cycle cathode materials at higher voltage. Typically NMC material cycles well at 4.2V, but problems appear when the voltage goes up to 4.3 or 4.35V. If we could improve the cycling stability at 4.35V, this would be quite promising for increasing the voltage range of current EV or HEV and further reduce cost. Therefore, "high-Ni" NMC cathodes (532, 622, ...) which can be cycled stably at a high voltage are needed for the automotive applications.

When looking more in detail to the issues of NMC materials at high voltage, it is observed that NMC usually displays serious side reactions with electrolyte at high voltage conditions. In the "*Journal of Power Sources*, 189 (2009) 288-296", S. K. Martha et al. suggest that layered lithium transition metal oxides $LiMO_2$ are highly reactive with alkyl carbonate/$LiPF_6$ solution species. The surface oxygen atoms of the cathode materials are nucleophilic and basic and react with the electrophilic alkyl carbonate solvents. Acidic HF and $PF_5$ contaminants also strongly react with $LiMO_2$. These side reactions are accelerated under high voltage conditions and lead to the detrimental dissolution of transition metal cations.

In "*Journal of Materials Chemistry*, 21 (2011) 17754-17759", Amine et al. emphasize that the dissolution of transition metal ions from the cathodes in Li-ion batteries is a detrimental phenomenon because these metal ions migrate from the cathode to the anode and are reduced to a metallic state at the Surface Electrolyte Interface. The metal or metal alloys deposited on the surface of the graphite anode has a negative effect on the stability of this SEI. Thus, the dissolution results in a reduction of the capacity and cyclability of the cell. In particular, the negative effect of manganese dissolution is more pronounced because it is believed that the dissolved manganese catalyzes electrolyte polymerization and/or decomposition. The paper of Martha mentioned before also finds that the dissolution rate of Mn is more than twice as high as that of Ni or Co.

In "*Energy Environment Science*, 4 (2011), 3243-3262", Etacheri et al. indicated that a possible solution for undesired side reactions and metal dissolution is the development of special surface protecting means, for example, coatings with thin layers of MgO, ZnO, to form a buffer zone that diminishes the interactions between acidic solution species and lithium transition metal oxides. In US2009/0087362, the authors provide a LCO powder that is covered by an $AlF_3$ layer. This coated LCO shows improved cycle stability in a LCO/Li half-cell when charged to 4.5V at both 25° C. and 55° C.

Therefore, an effective surface modification seems necessary in order to use high Ni NMC materials in high voltage application. An attempt with alumina coating or fluorine coating of NMC622 as suggested by the prior art (see the Examples) shows a small improvement, but it does not solve the metal dissolution issue sufficiently during high voltage and high temperature cycling. Thus, an object of the present invention is to improve the stability of high Ni NMC cathode materials at high voltage and high temperature—whilst maintaining the simple design of those materials—and provide this improved material for high end portable and automotive applications.

SUMMARY

Viewed from a first aspect, the invention can provide a lithium metal oxide powder for use as a cathode material in a rechargeable battery, comprising a core and a surface layer, the core having a layered crystal structure comprising the elements Li, M and oxygen, wherein M has the formula $M=(Ni_z(Ni_{1/2}Mn_{1/2})_yCo_x)_{1-k}A_k$, with $0.15 \leq x \leq 0.30$, $0.20 \leq z \leq 0.55$, $x+y+z=1$ and $0 \leq k \leq 0.1$, wherein A is a dopant, wherein the Li content is stoichiometrically controlled with a molar ratio $0.95 \leq Li:M \leq 1.10$; and wherein the surface layer comprises the elements Li, M' and oxygen, wherein M' has the formula $M'=(Ni_{z'}(Ni_{1/2}Mn_{1/2})_{y'}Co_{x'})_{1-k'}A_{k'}$, with $x'+y'+z'=1$ and $0 \leq k' \leq 0.1$, and wherein $y'/(y'+2z') \geq 1.1*[y/(y+2z)]$ and $2x/(y+2z)=2x'/(y'+2z')$. In one embodiment $y'/(y'+2z') \geq 2*[y/(y+2z)]$. In another embodiment the powder consists only of the core and the surface layer. A is a dopant, that is—as is generally known: a dopant, also called a doping agent, is a trace impurity element that is inserted into a substance (in very low concentrations) in order to alter the electrical properties (or the optical properties) of the substance. In another embodiment $y'/(y'+2z') \geq 3*[y/(y+2z)]$. This means that the ratio Mn/Ni in the surface layer is increased over the corresponding ratio in the core material. The material is more effective if the ratio is substantially increased.

It is an advantage that for the materials of the invention: $2x/(y+2z)=2x'/(y'+2z')$, meaning that the ratio Co/Ni is equal in the core and the surface layer. This formula expresses that there is no need for a difference in concentration of Co and Ni in the core versus the shell, enabling to maintain the simple design of the high-Ni powders that are made by a known sintering process. The suppression of the dissolution of Ni is obtained by the presence of the Mn gradient, without the need to have for example a lower Ni content at the surface of the powder. Furthermore, in an embodiment, the ratio Ni:Co:Mn (or x:y:z) is radially constant in the core of the material, expressing the advantage of a simple design without the need for full concentration gradient layered materials as proposed by the prior art. Radially constant means that the ratio x:y:z in the center of the particles is the same as x:y:z at the inner interface of the surface layer. In a further embodiment, the surface layer has an outer and an inner interface, the inner interface being in contact with the core, and wherein the concentration of Mn at the outer interface is higher than the concentration at the inner interface. The surface layer may have a gradient of Mn content that increases continuously from the Mn content of the core at the inner interface between core and surface layer, to a higher Mn content at the outer interface of surface layer.

The invention may further provide the material described before, wherein the surface layer comprises at least 3 mol % Al, the Al content in the surface layer being determined by XPS. In further embodiments either the surface layer comprises at least 5 mol % Al, the Al content in the surface layer being determined by XPS; at least 10 mol % Al, the Al content in the surface layer being determined by XPS. When the Al content is higher in the surface layer, the invention is more effective. In one embodiment, the core has an Al content of 0.1-3 mol %, and the surface layer has an Al content that increases from the Al content of the core at the inner interface to at least 10 mol % at the outer interface, the Al content both in the core and the surface layer being determined by XPS. In the previous embodiments, the surface layer may comprise or even consist of an intimate mixture of elements of the core (being either one, more or all of Li, M and oxygen) and nanometric crystalline $Al_2O_3$. In a further embodiment, the gradient of the Mn content in the surface layer is more pronounced than the gradient of the Al content, expressed by the ratio of the Mn to the Al content Mn/Al at the inner interface of the shell being smaller than the ratio of the Mn to the Al content Mn/Al at the outer interface of the shell.

The invention may further provide the material described before, wherein the core has an F content of less than 0.05 mol %, and wherein the surface layer has an F content that increases from less than 0.05 mol % at the inner interface to at least 3 mol % at the outer interface, the F content being determined by XPS.

In different embodiments of the invention, A is either one or more of the elements of the group consisting of Al, Ga, B, Ti, Mg, W, Zr, Cr and V. It may also be that the surface layer consists of an intimate mixture of elements of the core, LiF and $Al_2O_3$, and either one or more compounds of the group consisting of $TiO_2$, MgO, $WO_3$, $ZrO_2$, $Cr_2O_3$ and $V_2O_5$. Also, the surface layer may consist of an intimate mixture of elements of the core (being either one, more or all of Li, M and oxygen), LiF and nanometric crystalline $Al_2O_3$.

In various embodiments of the lithium metal oxide powder of the invention, either:
  a) $0.15 \leq x \leq 0.25$, $0.20 \leq z \leq 0.40$ and $1 \leq Li:M \leq 1.10$, or
  b) $x=0.20 \pm 0.02$, $y=0.40 \pm 0.05$, $z=0.40 \pm 0.05$ and $1 \leq Li:M \leq 1.10$, and the lithium metal oxide powder comprises up to 1 mol % Al, or
  c) the F content of the core=0 mol %.

In a particular embodiment, the surface layer has an outer and an inner interface, the inner interface being in contact with the core, and wherein the concentration of Mn at the outer interface is higher than the concentration at the inner interface; wherein the surface layer has an Al content that increases from the Al content of the core at the inner interface to at least 10 mol % at the outer interface; wherein the surface layer has an F content that increases from less than 0.05 mol % at the inner interface to at least 3 mol % at the outer interface, the Al and F content being determined by XPS.

In all these embodiments the surface layer may have a thickness between 50 and 400 nm, the surface layer being evidently the layer with the increased Mn/Ni ratio.

It is clear that further product embodiments according to the invention may be provided by combining individual features that are covered by the different product embodiments described before.

Viewed from a second aspect, the invention can provide a method for making the lithium metal oxide powder of the invention, comprising the steps of:

providing a first mixture comprising a lithium M-oxide powder, with $M=(Ni_z(Ni_{1/2}Mn_{1/2})_yCo_x)_{1-k}A_k$, $0.15 \leq x \leq 0.30$, $0.20 \leq z \leq 0.55$, $x+y+z=1$ and $0 \leq k \leq 0.1$, and a first precursor compound comprising Mn, heating the first mixture to a first sintering temperature between 500° C. and 700° C., sintering the first mixture at the first sintering temperature for a first period of time, thereby obtaining the lithium metal oxide powder, and cooling the powder.

The invention may also provide a method for making the lithium metal oxide powder of certain embodiments of the invention, comprising the steps of:

providing a first mixture comprising a lithium M-oxide powder, with $M=(Ni_z(Ni_{1/2}Mn_{1/2})_yCo_x)_{1-k}A_k$, $0.15 \leq x \leq 0.30$, $0.20 \leq z \leq 0.55$, $x+y+z=1$ and $0 \leq k \leq 0.1$, and a first precursor compound comprising Al, heating the first mixture to a first sintering temperature between 600° C. and 800° C., sintering the first mixture at the first sintering temperature for a first period of time, cooling the first sintered mixture, adding a second precursor compound comprising Mn to the first sintered mixture, thereby obtaining a second mixture, heating the second mixture to a second sintering temperature between 500° C. and 700° C., sintering the second mixture at the second sintering temperature for a second period of time, thereby obtaining the lithium metal oxide powder, and cooling the powder. In an alternative process, the first precursor compound comprises Mn, and the second precursor compound comprises Al.

The invention may also provide a method making the lithium metal oxide powder of certain embodiments of the invention, comprising the steps of:

providing a first mixture comprising a lithium M-oxide powder, with $M=(Ni_z(Ni_{1/2}Mn_{1/2})_yCo_x)_{1-k}A_k$, $0.15 \leq x \leq 0.30$, $0.20 \leq z \leq 0.55$, $x+y+z=1$ and $0 \leq k \leq 0.1$, and a first precursor compound comprising Al, heating the first mixture to a first sintering temperature between 600° C. and 800° C., sintering the first mixture at the first sintering temperature for a first period of time, cooling the first sintered mixture, adding a second precursor compound comprising Mn to the first sintered mixture, thereby obtaining a second mixture, heating the second mixture to a second sintering temperature between 500° C. and 700° C., sintering the second mixture at the second sintering temperature for a second period of time, thereby obtaining a second sintered mixture, cooling the second sintered mixture, adding a fluorine-containing polymer and a third precursor compound comprising Al to the second sintered mixture, thereby obtaining a third mixture, heating the third mixture to a third sintering temperature between 250° C. and 500° C., sintering the third mixture at the third sintering temperature for a third period of time, thereby obtaining the lithium metal oxide powder, and cooling the powder.

Another method embodiment comprises the steps of:

providing a mixture comprising a lithium M-oxide powder, with $M=(Ni_z(Ni_{1/2}Mn_{1/2})_yCo_x)_{1-k}A_k$, $0.15 \leq x \leq 0.30$, $0.20 \leq z \leq 0.55$, $x+y+z=1$ and $0 \leq k \leq 0.1$, a first precursor compound comprising Mn and a second precursor compound comprising Al, heating the mixture to a sintering temperature between 500° C. and 700° C., sintering the mixture at the sintering temperature for a period of time, and cooling the sintered mixture. In this method embodiment, before the final cooling step the steps may be included of: adding a fluorine-containing polymer and a third precursor compound comprising Al to the second sintered mixture, thereby obtaining a third mixture, heating the third mixture to a third sintering temperature between 250° C. and 500° C., sintering the third mixture at the third sintering temperature for a third period of time, thereby obtaining the lithium metal oxide powder.

In an embodiment of the various processes described before, the second precursor compound comprising Al is a nanometric alumina powder having a D50<100 nm and a BET≥250 m²/g. In another embodiment the first precursor compound comprising Mn and the second precursor compound comprising Al are a mixture of $Mn(NO_3)_2$ and $Al(NO_3)_3$. In various process embodiments, there may also be provided a mixture of a lithium M-oxide powder, with $M=(Ni_z(Ni_{1/2}Mn_{1/2})_yCo_x)_{1-k}A_k$, $0.15 \leq x \leq 0.30$, $0.20 \leq z \leq 0.55$, $x+y+z=1$ and $0 \leq k \leq 0.1$, a dry alumina powder and a slurry comprising $Mn(NO_3)_2$, whereupon the mixture is heated to a sintering temperature between 500° C. and 700° C., sintered at that temperature for a period of time, and cooled.

In different embodiments, either:

the first sintering temperature is between 650° C. and 750° C., or the second sintering temperature is between 650° C. and 750° C., or the third sintering temperature is between 350° C. and 400° C.

The sintering time may be from 5 to 10 hr. In one embodiment, the surface modification method comprises a step of spraying and drying at the same time an aqueous solution containing a manganese element on an active material, followed by a post treatment by heating. The aqueous solution can be prepared by dissolving a substance containing a manganese element in deionized water, such as manganese nitrate. By using a tumbling fluidized coating apparatus, the aqueous solution can gradually be sprayed on the surface of the active material powder. After spray coating, the powder is heated at high temperature to obtain the surface layer according to the invention. The heating temperature directly influences the diffusion rate of transition metal or lithium during the heat treatment. If the temperature is too low, the manganese nitrate cannot decompose to form manganese oxide and it is hard for the transition metal to diffuse in the active material. The temperature range can be 300° C. to 900° C., preferably 500° C. to 700° C. If the temperature is too high then during the heat treatment the manganese layer diffuses deep into the bulk (or Ni and Co diffuse onto the surface) and as a result the manganese gradient practically vanishes.

It is clear that further method embodiments according to the invention may be provided by combining features that are covered in each of the different method embodiments described before.

Viewed from a third aspect, the invention can provide a battery comprising a cathode material comprising the lithium metal oxide powder according to the invention, wherein the battery is used in a portable electronic or an automotive application. The invention thus provides an electrochemical cell comprising the lithium metal oxide powder according to the different embodiments of the invention, and the use of the lithium metal oxide powder of the invention in a battery of either one of a portable computer, a tablet, a mobile phone, an electrically powered vehicle and an energy storage system.

It is appropriate to mention here that several prior art documents discuss materials having a core-shell composition with different Mn and/or Al contents for the core and the shell. Such documents are:

Yang-Kook Sun et al. "Microscale core-shell structured $Li[(Ni_{0.8}Co_{0.1}Mn_{0.1})_{0.8}(Ni_{0.5}Mn_{0.5})_{0.2}]O_2$ as positive electrode material for lithium batteries", Electrochemical and Solid-State Letters, vol. 9, no. 3, 2006, p. A171;

Yang-Kook Sun et al. "High-energy cathode material for long-life and safe lithium batteries", Nature Materials, vol. 8, no. 4, 2009, pp. 320-324;

Lee Eung-Ju et al. "Effect of outer layer thickness on full concentration gradient layered cathode material for lithium-ion batteries", Journal of Power Sources, vol. 273, pp. 663-669;

Yoon Sung-Yun et al. "Improved performances of $Li[Ni_{0.65}Co_{0.08}Mn_{0.27}]O_2$ cathode material with full concentration gradient for Li-ion batteries", Journal of the Electrochemical Society, vol. 162, no. 2, 2014, pp. A3059-A3063;

US2013/0202966 A1;

EP2698351 A1; and

WO2013/189109 A1 (also published as US2015/0104708 A1).

DETAILED DESCRIPTION

Figure 1:
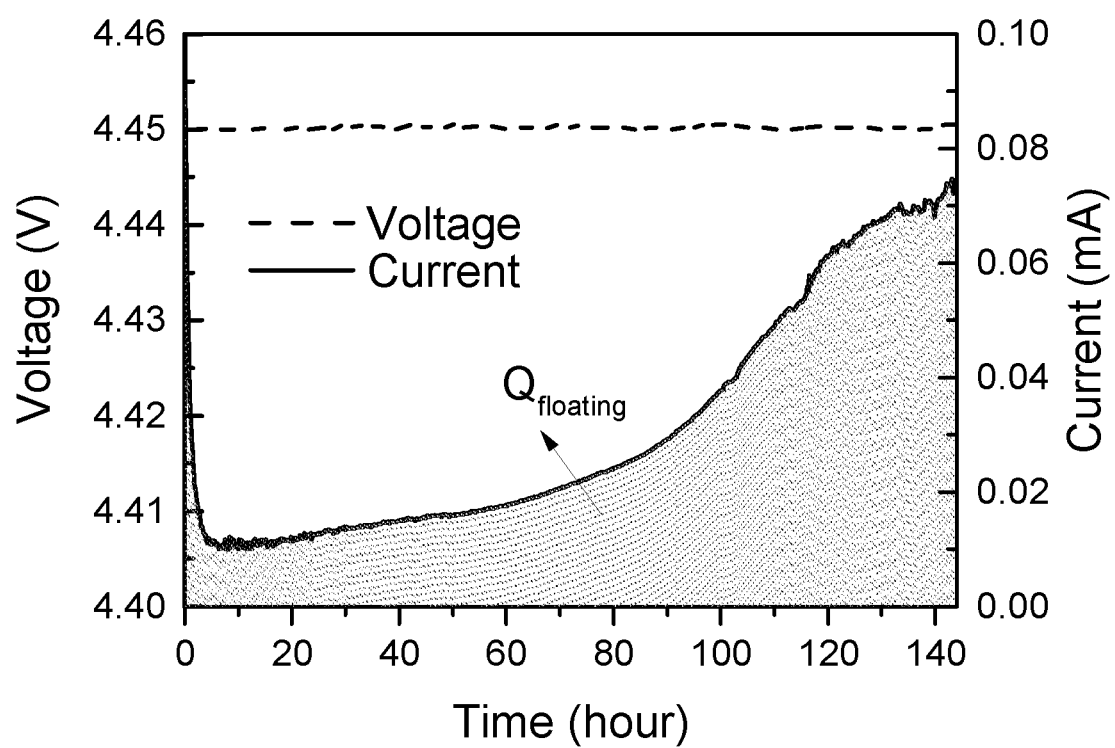
FIG. 1: Illustrative graph of floating test results.

This invention provides NMC cathode material with improved cycle stability when charged up to 4.35V and 4.4V in full cells at elevated temperature. The cathode material also shows excellent bulging—i.e. very little gas evolves. These materials have a high Ni content which can provide a significantly higher energy density compared to existing commercial NMC cathode materials, for example NMC111. The powders could even be competitive with commercial LCO when considering the energy density. Therefore, the cathode materials according to the invention are promising candidates for a use in high end portable electronics and automotive applications.

The authors discovered that NMC cathode powders with surface layers that have a Mn gradient with or without an Al gradient and eventually an F gradient can reduce the side reactions that happen between cathode material and electrolyte, including metal dissolution. Based on the manganese gradient, the addition of an Al gradient with or without an F gradient in the surface layer can also contribute to improve the cycle stability when the cathode materials are charged to high voltage (4.35V or 4.4V). This invention observes that the Ni dissolution is the dominating issue when a high Ni NMC cathode material is charged at high voltage and elevated temperature for a long time. In one embodiment, the high Ni NMC material is NMC622 and it is charged at 4.6V and 50° C. for 144 hours. Floating test results show that the dissolution of Ni from NMC622 powders is much higher than Co or Mn. Ni dissolution was not widely studied in the prior art publications. Instead of Ni, Mn dissolution was mostly considered in the stability test of NMC material during cycling or high temperature storage. In the case of NMC622, Mn dissolution is minor.

This invention discloses that the gradient of Mn in a surface layer can reduce the Ni dissolution at high voltage and high temperature. In one embodiment, the cathode material has a core comprising a compound with a formula of $LiNi_{0.6}Mn_{0.2}Co_{0.2}O_2$ and a surface layer coating on the core. The surface layer has for example a Mn content that increases continuously from 20 mol % at the inner interface between core and surface layer, to more than 24 mol % at the outer interface of surface layer. This cathode material base coin cell is charged at 4.6V and 50° C. for 144 hours. Its floating results, discussed below, show that the Mn gradient in the surface layer limits Ni dissolution. The weight of Ni dissolution is for example reduced from 0.1107 mg to 0.0288 mg, which is a 74 wt % reduction (see Example 4). The fact that Ni dissolution is reduced after a Mn coating approach (which results in a manganese gradient and a manganese enrichment of the surface) is not surprising; it could be suspected that Ni dissolution is simply replaced by manganese dissolution. However, surprisingly it is observed that the manganese enriched surface not only decreases the nickel dissolution but also reduces manganese dissolution.

This invention observes that an Al and/or F gradient coating alone on the NMC material reduces the metal dissolution, but does not sufficiently solve this problem. In one example, there is at least a reduction of Ni dissolution by 50 wt % and 30 wt % resp. in the cases of a) Al gradient coated and b) Al and F gradients coated NMC622. This invention also observed that the Al gradient combined with F gradient coating on the NMC material can reduce side reactions during high temperature storage. In one embodiment, this coated NMC622 presents less thickness increase percentage—with bare NMC622 as a reference—in the bulging test that is described below. Usually the combination of different approaches does not yield a good performance, but the cathode material with surface layer containing both Mn gradient and Al gradient provides a surprising result. The metal dissolution issue in such material is much improved. In one embodiment, the cathode material has a core comprising a compound with a formula of $LiNi_{0.6}Mn_{0.2}Co_{0.2}O_2$ and a surface layer having a Mn content that increases continuously from 20 mol % at the inner interface between core and surface layer, to more than 24 mol % at the outer interface of surface layer; and an Al gradient that increases continuously from less than 0.05 mol % at the inner interface to more than 10 mol % at the outer interface, and preferably more than 12 mol %. The Ni dissolution of this cathode material is much reduced in high voltage charging. It is believed that there is synergetic effect of Mn gradient coating and alumina coating on reducing side reactions and improving high voltage stability. Mn, Al and F gradient co-coated NMC cathode material also provides a good performance. This material gives an excellent stability at high voltage and high temperature cycling. Therefore, considering the high voltage stability of coated NMC622 according to this invention, it is quite promising to be applied as cathode material in the portable device and automotive application, especially when it is mixed with high voltage LCO material.

EXPERIMENTAL DETAILS

Preparation of NMC Powder and Surface Modification of NMC Powder (a) The core compound-NMC powder is manufactured by the following steps:

1) Blending of lithium and nickel-manganese-cobalt precursor: lithium carbonate and a mixed Ni—Mn—Co oxyhydroxide are homogenously blended in a vertical single-shaft mixer by a dry powder mixing process. The blend ratio is targeted to obtain $Li_xNi_aMn_bCo_{1-a-b}O_2$, wherein $0.4<a<0.7$, $0.1<b<0.3$, $0.95\leq x\leq1.05$, which can be easily verified by an analysis techniques such as ICP. In the Examples more specifically $Li_{1.01}(Ni_{0.6}Mn_{0.2}Co_{0.2})_{0.99}O_2$ is prepared.

2) Synthesizing in an oxidizing atmosphere: the powder mixture from step 1) is sintered in a box furnace in an oxidizing atmosphere. The sintering temperature is ≥850° C. and the dwell time is ~10 hrs. Dry air is used as an oxidizing gas.

3) Milling: after sintering, the sample is milled in a grinding machine and sieved.

(b) Al Doping and Alumina Coating:

1 kg of NMC-based powder (which could be NMC powder from step (a)) is charged in a mixer (in the examples a 2 L Henschel type Mixer) and 2 g of fumed alumina ($Al_2O_3$) nanopowder is added. After homogeneously mixing (usually 30 min. at 1000 rpm), the mixture is sintered in a box furnace in an oxidizing atmosphere. The sintering temperature is 700° C. and the dwell time is ~5 hrs. Dry air is used as an oxidizing gas. It can be verified by XPS measurements that after the sintering step a gradient is established at the surface with increasing Al content versus the outside of the particles.

(c) Alumina and LiF Coating:

1 kg of NMC-based powder (which could be NMC powder from step (a) or (b) but also powders obtained after the other steps (b) and (d)) is filled into a mixer (in the example a 2 L Henschel type Mixer), 2 g of fumed alumina ($Al_2O_3$) nano-powder and 3 g polyvinylidene fluoride (PVDF) powder is added. After homogeneously mixing (usually 30 min. at 1000 rpm), the mixture is sintered in a box furnace in an oxidizing atmosphere. The sintering temperature is 375° C. and the dwell time is ~5 hrs. Dry air is used as an oxidizing gas. It can be verified that after sintering the surface layer is a mixture of elements of the core, LiF and $Al_2O_3$, and the surface layer has both an Al and an F gradient.

In the Examples it will be shown that step (c) can also be applied on powders obtained from step (b) followed by step (d)

(d) Mn Coating of NMC Powder:

1) Preparation of aqueous solution: manganese nitrate salt ($Mn(NO_3)_2 \cdot 6H_2O$ produced by Wako Chem. Ltd.) is added to deionized water to provide a 50 wt % manganese nitrate solution.

2) Spraying and drying: in a tumbling fluidized coating apparatus, the aqueous solution of step 1) is sprayed and dried on the surface of NMC core material under 90° C. hot air. The molar ratio of manganese in the nitrate solution to transition metal in the NMC core material is 1 mol %. Because the active material is fluidized by hot air during spraying, the moisture of the spraying solution vaporizes immediately. Finally a coated active material with a coating layer on the surface is obtained.

3) Heat treatment: after spray coating, the coated powder is heated under dry air at 550° C. for 5 hours.

In the Examples it will be shown that step (d) and (b) can be interchanged when step (c) is not applied. Also step (d) can be applied before step (c).

(e) The NMC powder can be simultaneously coated with Mn and alumina through the following steps: 1 kg of NMC powder (from (a)) is charged in a mixer and 2 g of fumed alumina ($Al_2O_3$) nanopowder is added. After homogeneously mixing, the mixture is spray coated with 50 wt % manganese nitrate solution and dried under 90° C. hot air in a tumbling fluidized coating apparatus. The molar ratio of manganese in the nitrate solution to transition metal in the NMC core material is 1 mol %. After spray coating, the coated powder is heated under dry air at 600° C. for 5 hours.

Floating Test

In a recent technical report of "3M battery electrolyte HQ-115", a float charging method is used to test the stability of novel electrolyte at high voltage. The method is carried out by continuously charging LCO/graphite pouch cells or 18650 cells at 4.2V and 60° C. for 900 hours. The currents recorded under charge are compared. A higher current reflects more side reactions that occur, so this method is available to study the side reactions of battery at high voltage. In "*Energy Environment of Science,* 6 (2013), 1806-1810", Zhang et al. use the float charging method to test the stability of electrolyte against oxidation under high voltage of 5 to 6.3V. Based on the above knowledge, by choosing a relatively stable electrolyte and anode material for the required charging voltage, this method can be used to study the stability of cathode material under high voltage, such as NMC material, where the metal dissolution can be reflected by the leakage current. In addition, in "*Nature Communication,* 4:2437 (2013), doi: 10.1038/ncomms3437", Zhan et al. report that the dissolved manganese from lithium manganese oxide cathode is deposited on the anode, and the deposited amount can be detected by inductively coupled plasma-atomic absorption spectrometry (ICP-AAS). This ICP test can also be employed to study the metal dissolution issue of NMC material. Therefore, the float charging test associated with ICP measurement (referred to hereafter as "floating test") is a feasible way to evaluate the side reaction and metal dissolution of NMC cathode materials at high voltage and elevated temperature.

This electrochemical test aims to analyze the stability of cathode materials at high voltage charging at elevated temperature (50° C.). In some embodiments, the tested cells configuration is a coin cells, that is assembled as follows: two separators (from SK Innovation) are located between a positive electrode and a negative electrode. 1M $LiPF_6$ in EC/DMC (1:2) is used as an electrolyte, dropped between separator and electrodes. The prepared coin cell is tested according to the following charge protocols: the coin cell is firstly charged to a defined upper voltage (4.60V for NMC622) at constant current mode and C/20 rate (with 1C=160 mAh/g), then is kept constant at the upper voltage for 5 days or more at high temperature (50° C.). After the floating test, the coin cell is disassembled. The anode and separator close to the anode are analyzed by ICP for a metal dissolution analysis.

FIG. 1 displays the results of a typical floating test. First the cathode is charged (data not shown) under CC (constant current) mode. As the final voltage is reached the cell is continuously charged in constant voltage (CV) mode. The graph shows the current and t=0 is the time where the CV mode charging started. Once side reactions or metal dissolution happens, there will be a voltage drop. The electrochemical instrument will automatically compensate the (lost) current to keep the voltage constant. Therefore the recorded current is a measure of the ongoing side reactions. As shown in FIG. 1, time starts from the beginning of constant voltage charge, the recorded voltage and current are respectively represented by dash and solid lines. From the change of the current, we can observe the degradation of the tested coin cell at high voltage and temperature. The $Q_{floating}$—integral of current—could qualitatively describe how severe the metal dissolution is in the tested coin cell. Thus, this specific floating capacity is a key factor to evaluate the stability of cathode material at high charging voltage and at high temperature.

Bulging Test

Besides the floating test, a bulging test is also necessary to analyze and confirm the stability of high Ni NMC material at high temperature and high charging voltage, especially in the full cell scale. A fully charged full cell (at high voltage), comprising a high Ni NMC positive electrode and a negative electrode, is stored at high temperature for a certain time. The change of the thickness suggests the state of gas evolution, which further demonstrates the stability of full cell. This test is required for supplying NMC having good stability in high voltage cycling without much bulging, which is essential for replacing LCO in high end portable electronics applications.

Practically, the full cells are prepared as follows:
a) Full Cell Making
a.1) Slurry Making and Coating A slurry is prepared by mixing 700 g of NMC cathode material with NMP, 47.19 g of super P® (conductive carbon black of Timcal) and 393.26 g of 10 wt % PVDF based binder in NMP solution. The mixture is mixed for 2.5 hrs in a planetary mixer. During mixing additional NMP is added. The mixture is transferred to a Disper mixer and mixed for 1.5 hrs under further NMP addition. A typical total amount of NMP used is 423.57 g. The final solid content in the slurry is about 65 wt %. The slurry is transferred to a coating line. Double coated electrodes are prepared. The electrode surface is smooth. The electrode loading is 9.6 mg/cm². The electrodes are compacted by a roll press to achieve an electrode density of about 3.2 g/cm³. The electrodes are used to prepare pouch cell-type full cells as described hereafter.

a.2) Full Cell Assembly

For full cell testing purposes, the prepared positive electrodes (cathode) are assembled with a negative electrode (anode) which is typically a graphite type carbon, and a porous electrically insulating membrane (separator). The full cell is prepared by the following major steps: (a) electrode slitting, (b) electrode drying, (c) jellyroll winding, and (d) packaging.

(a) electrode slitting: after NMP coating the electrode active material might be slit by a slitting machine. The width and length of the electrode are determined according to the battery application.

(b) attaching the taps: there are two kinds of taps. Aluminum taps are attached to the positive electrode (cathode), and copper taps are attached to the negative electrode (anode).

(c) electrode drying: the prepared positive electrode (cathode) and negative electrode (anode) are dried at 85° C. to 120° C. for 8 hrs in a vacuum oven.

(d) jellyroll winding: after drying the electrode a jellyroll is made using a winding machine. A jellyroll consists of at least a negative electrode (anode) a porous electrically insulating membrane (separator) and a positive electrode (cathode).

(e) packaging: the prepared jellyroll is incorporated in a 650 mAh cell with an aluminum laminate film package, resulting in a pouch cell. Further, the jellyroll is impregnated with the electrolyte. The electrolyte used is a commercial product from Panax Etec Ltd. The composition is 1 M $LiPF_6$ in EC:DEC:EMC (1:1:1, m/m/m) with VC, LiBOB and PRS as additives. The quantity of electrolyte is calculated in accordance with the porosity and dimensions of the positive and negative electrode, and the porous separator. Finally, the packaged full cell is sealed by a sealing machine.

In the bulging test, fully charged cells are stored in an oven at 90° C. for 4 hrs. Typically the charge voltage is 4.35V. The reaction between active material and electrolyte generates gas in a full cell, resulting in the increase of battery thickness (bulging). The thickness of the full cells is measured before and after storing in the oven. The reported value is the ratio of increased full cell thickness, expressed in % increase versus the initial thickness.

XPS Measurement

The measurements are carried out in a Quantera SXM™ from ULVAC-PHI (Q2). The measurements are performed using monochromatic Al-Kα-radiation and a spot size of 100 μm scanning across an area of 1200×500 μm (High Sensitivity Mode). The measurement angle Θ is 45°; at this setting the information depth is approximately 7 nm. By means of wide-scan measurements the elements present at the surface are identified. Accurate narrow-scans are performed to determine the precise surface composition. Concentration—depth profiles are determined by alternating measurements and ion bombardment (Argon ions, Vi=4 kV, raster 3×3 mm, sputter rate in $SiO_2$: 6.0 nm/minute). The XPS gives a measurement only from the surface up to approx. 200 nm inside the particles. Known techniques such as ICP give the average composition of the powder. It is known that ICP gives a more accurate average measurement than XPS, but XPS is especially adequate to investigate the differences in composition at different depths in a surface layer.

The following examples illustrate the present invention in more detail.

Example 1: Floating Test of Bare NMC622 and Bare NMC532

Figure 2:
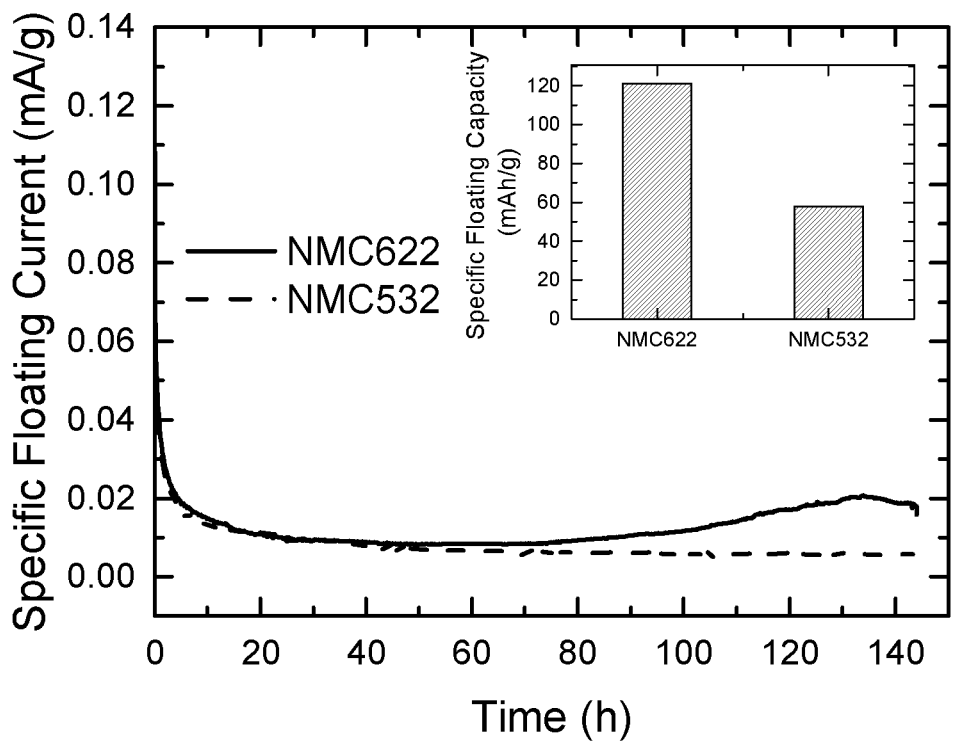
FIG. 2: Floating test results for bare NMC622 and NMC532.

FIG. 2 illustrates the floating test of coin cells, where the positive electrode materials is pristine $Li_{1.01}(Ni_{0.6}Mn_{0.2}Co_{0.2})_{0.99}O_2$(bare NMC622) and pristine $Li_{1.02}[Ni_{0.5}Mn_{0.3}Co_{0.2}]_{0.98}O_2$(bare NMC532), both prepared according to step (a) in "Preparation of NMC powder and surface modification of NMC powder". The coin cell is charged at a constant voltage of 4.6V at 50° C. for 144 hours. The plot shows the evolution of floating current over time (in h). The solid line corresponds to NMC622 while the dash line is for NMC532. The current unit is mA/g where the mass refers to the active cathode mass. Ignoring the drop at the beginning, which is due to the switch of charging mode, it is clear that the floating current of NMC622 gradually increases during high voltage charge, while the current of NMC532 basically keeps constant. The lift of current indicates more metals dissolving from NMC622 than NMC532 cathode material. This can be confirmed from the inserted graph, where it shows the comparison of specific floating capacity $Q_{floating}$ (in mAh/g) between NMC622 and NMC532. The capacity is integrated based on the floating current change upon time. It clearly illustrates that NMC622 based coin cell requires almost twice the amount of capacity as NMC532 based coin cell to compensate voltage loss. Therefore, the metal dissolution is much more severe in the case of NMC622. This indicates the stability of high Ni NMC at high voltage becomes worse when the Ni content increases.

Figure 3:
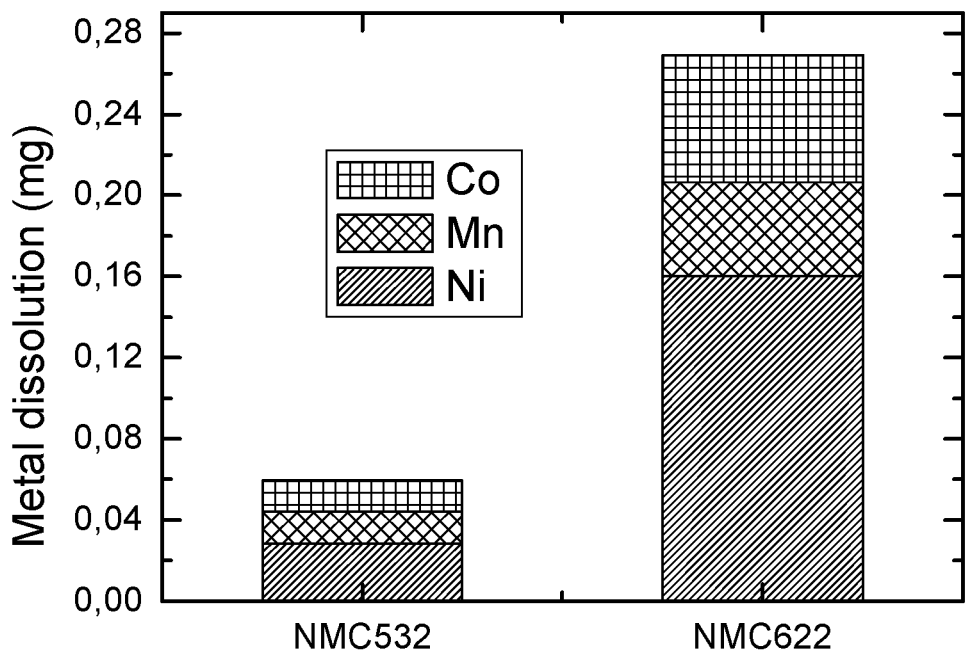
FIG. 3: Metal dissolution of bare NMC622 and NMC532.

FIG. 3 presents the dissolution weight of Ni, Mn and Co in the floating test of NMC622 and NMC532. The data are obtained by an inductively coupled plasma (ICP) test of the anode after the floating test, and the metal dissolution is expressed in mg.

In the Figure, it is shown that there is more metal dissolved in NMC622, for all the three metals, which confirms the above conclusion. Moreover, the Ni dissolution is much more severe than the Mn or Co dissolution, especially in the case of NMC622. Thus, the Ni dissolution is dominant amongst the metal dissolution of high Ni NMC at high voltage. It is an important factor to evaluate the stability of high Ni NMC material at high voltage and high temperature.

An important conclusion is that the metal dissolution of Mn, Co and Ni is not proportional to the composition. The higher Mn content in NMC532 causes generally a much lower dissolution, as a consequence of this not only the major Ni contribution is dramatically less, but even the manganese dissolution is lower. The comparison of NMC532 and 622 is an indication that the Mn coating approach of the current invention also causes a reduction of the metal dissolution, as is shown in Ex. 4-7.

Example 2: Floating Test of Bare NMC622, Alumina Coated NMC622 and Alumina-LiF Coated NMC622

Figure 4:
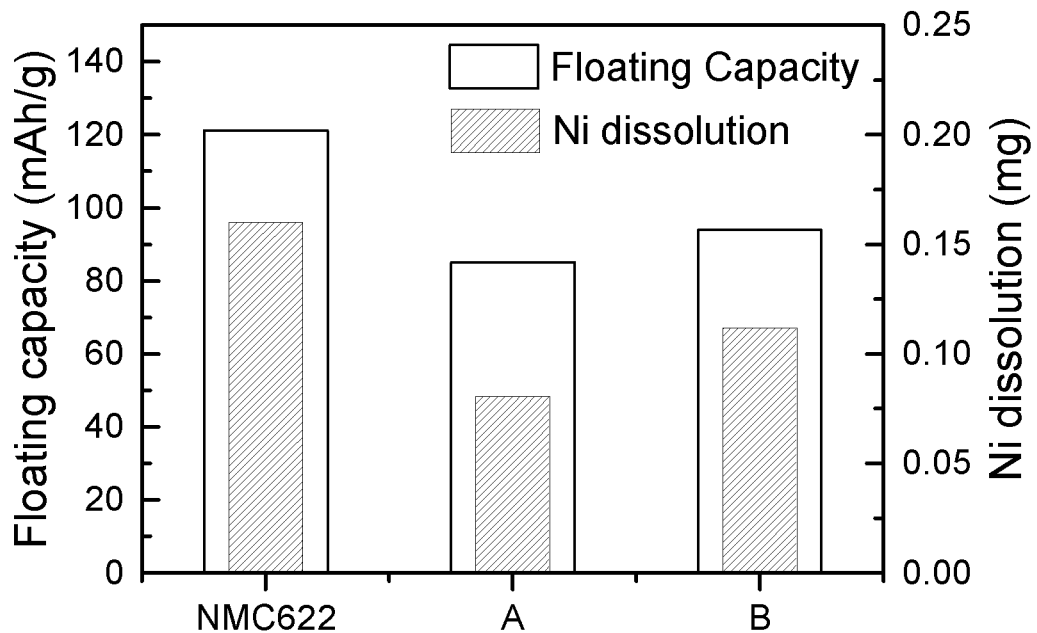
FIG. 4: Floating capacity of bare NMC622, alumina coated NMC622(A) and alumina-LiF coated NMC622(B).

FIG. 4 illustrates the floating test of coin cells, where the positive electrode materials is resp. bare NMC622, "A" and "B", and the negative electrode material is graphite. Here, "A" represents cathode material $Li_{1.01}(Ni_{0.6}Mn_{0.2}Co_{0.2})_{0.99}O_2$ coated with a surface layer containing an Al gradient. Sample "A" is prepared through steps (a) and (b) in the "Preparation of NMC powder and surface modification of NMC powder". "B" represents cathode material $Li_{1.01}(Ni_{0.6}Mn_{0.2}Co_{0.2})_{0.99}O_2$ coated with a surface layer containing both an Al and F gradient according to the invention. Sample "B" is prepared through steps (a) and (c) in the "Preparation of NMC powder and surface modification of NMC powder". The floating condition is as follows: charging voltage is set as 4.6V; temperature is at 50° C.; charging time is 144 hrs.

The left y-axis gives the specific floating capacity $Q_{floating}$ of the three kinds of cathode materials based coin cells: bare NMC622, "A" and "B". The right y-axis gives the weight of Ni dissolution during the floating test, which is obtained from the ICP test of the anode after the floating test. Compared with bare NMC622 material, both of "A" and "B" material have less floating capacity and less Ni dissolution. This demonstrates that alumina coating or alumina-LiF coating has a positive effect on metal dissolution at high voltage and high temperature. Moreover, the floating capacity and Ni dissolution of sample "A" are slightly smaller than those of sample "B". This suggests that the combination of alumina and LiF coating may not have additional benefit on the metal dissolution issue, when compared with solely alumina coating.

Example 3: Bulging Test of Alumina and LiF-Coated NMC622

Figure 5:
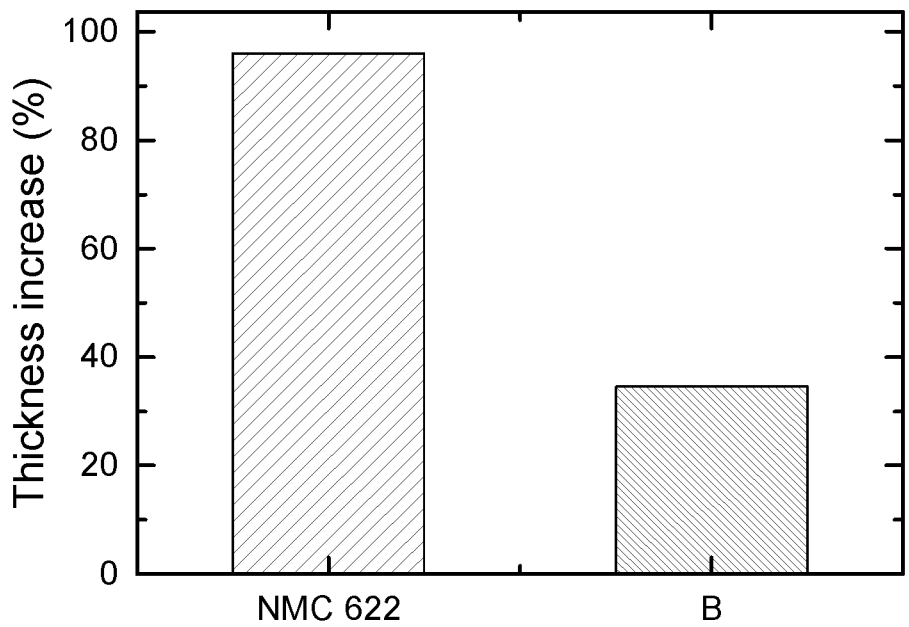
FIG. 5: Bulging test thickness increase for bare NMC622 and alumina-LiF coated NMC622(B).

FIG. 5 provides the bulging test results of two kinds of full cells. The bulging results are represented by the increase percentage of full cell thickness after storage at 90° C. for 4 hrs. The sole difference between these two full cells is the cathode material: one employs bare NMC622, while the other comprises material "B". From the Figure, it is clear that the bare NMC622 based full cell shows nearly 100% thickness increase, while the "B" based full cell only presents about 40% thickness increase. Thus, "B" cathode material has less side reactions that produce gases during a bulging test. This further demonstrates that alumina and LiF coating plays a role in preventing side reaction between electrolyte and NMC622. There is agreement between the bulging and floating results of "B", since both confirm the reduction of side reactions by alumina and LiF coating. To a certain extent, the performance of a coin cell in the floating test, where the experimental condition is very extreme and seldom used in the practical application, matches quite well with the performance of the full cell in the bulging test. Thus, the floating results for cathode materials can be used to check the stability of these material at high voltage in the full cell application.

Example 4: Preparation and Floating Test of Mn-Coated NMC622

Figure 6:
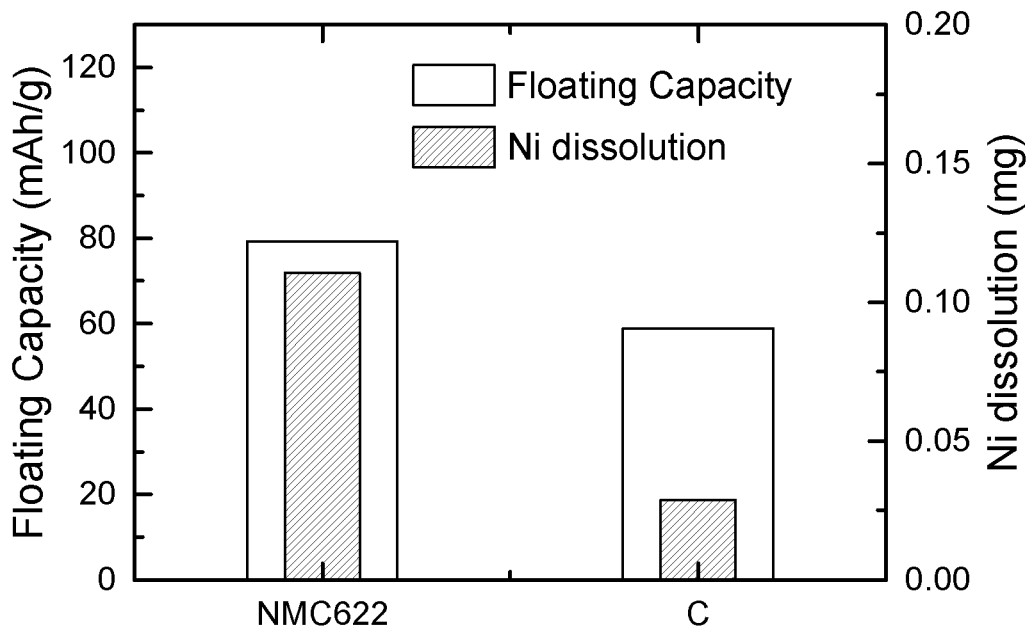
FIG. 6: Floating capacity and Ni dissolution of bare NMC622 and Mn coated NMC622(C).

A coated $Li_{1.01}(Ni_{0.6}Mn_{0.2}Co_{0.2})_{0.99}O_2$ cathode material, where the surface layer containing a Mn gradient according to the present invention is prepared. The core material $Li_{1.01}(Ni_{0.6}Mn_{0.2}Co_{0.2})_{0.99}O_2$ (NMC622). The coating procedure is completed by the step (d) of "Preparation of NMC powder and surface modification of NMC powder". The above manufactured cathode material is labeled "C" in the following description. FIG. 6 shows the floating test and metal dissolution results of two coin cells, where the positive electrode materials is resp. bare NMC622 and "C". The floating test is performed by charging a coin cell at 4.6V for 120 hrs with temperature as 50° C. From the Figure, it is observed that the floating capacity of sample "C" is smaller than that of bare NMC622, and the Ni dissolution is also much reduced in sample "C". Furthermore, the percentage of Ni dissolution in sample "C" versus bare NMC622 is 26%. In the case of sample "A" and "B", the values are 50% and 70% respectively. Thus, the coating of Mn compounds on NMC622 has more benefit than both alumina and "alumina and LiF" coating in reducing the metal dissolution at high voltage charging.

Example 5: Floating Test of Alumina and Mn Coated NMC622

This Example presents a coated $Li_{1.01}(Ni_{0.6}Mn_{0.2}Co_{0.2})_{0.99}O_2$ cathode material, where the surface layer contains both an Al and a Mn gradient according to the present invention, the surface layer being composed of two layers: an Al gradient coating as the inner layer and a Mn gradient coating as the outer layer. The core compound $Li_{1.01}(Ni_{0.6}Mn_{0.2}Co_{0.2})_{0.99}O_2$ is prepared as in Example 1. The inner layer of Al gradient is firstly coated on the core compound through step (b), as in Example 2. The Mn gradient layer is then coated on the inner layer following the same procedure as in the Example 4. The above alumina and Mn coated NMC622 cathode material is labeled "D" in the following description.

Figure 7:
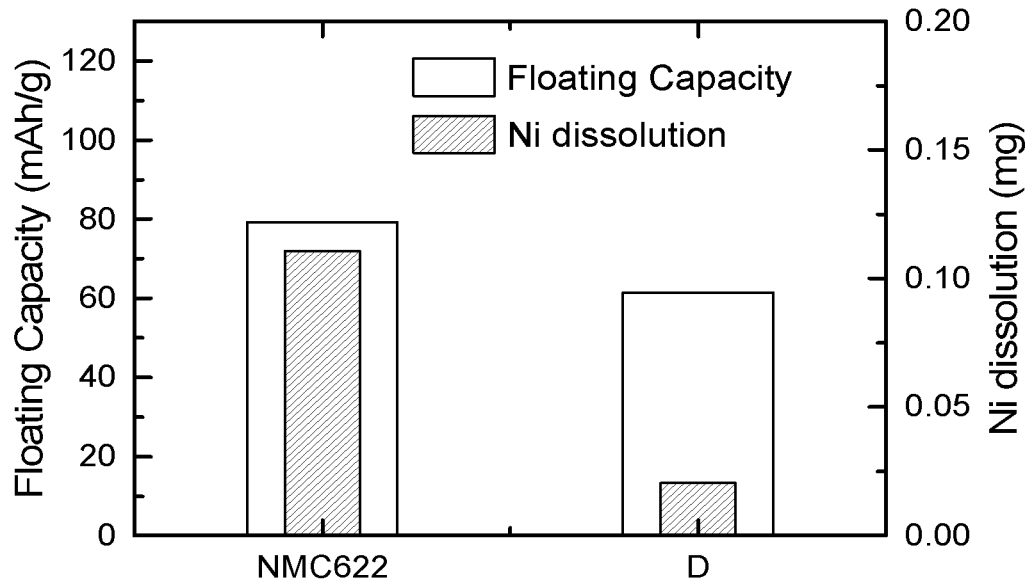
FIG. 7: Floating capacity and Ni dissolution of bare NMC622 and Mn (inner layer) and alumina (outer layer) coated NMC622(D).

FIG. 7 shows the floating test and metal dissolution results of two coin cells, where the positive electrode materials are bare NMC622 and material "D". The floating test results are both obtained by charging the coin cells at 4.6V for 120 hrs at a temperature of 50° C. From the Figure, it is observed that the floating capacity of sample "D" is smaller than that of NMC622, and the Ni dissolution is also much reduced in sample "D". When comparing to sample "C", sample "D" shows a certain improvement in metal dissolution, where the mass of dissolved Ni is relatively smaller. Thus, the combination of Mn coating and alumina coating provides more improved stability for NMC622 material at high voltage and temperature than pure Mn coating. Furthermore, in the Example 4, it is confirmed that the Mn-coated NMC622 has less Ni dissolution than alumina coating (compare FIG. 6 to FIG. 4), therefore, the coating of both Mn and alumina is also more beneficial than solely alumina coating.

Example 6: Floating Test of Mn and Alumina Coated NMC622

This Example presents a coated $Li_{1.01}(Ni_{0.6}Mn_{0.2}Co_{0.2})_{0.99}O_2$ cathode material, where the surface layer contains both an Al and a Mn gradient according to the present invention, the surface layer being composed of two layers: a Mn gradient coating as the inner layer and an Al gradient coating as the outer layer. The core compound $Li_{1.01}(Ni_{0.6}Mn_{0.2}Co_{0.2})_{0.99}O_2$ is prepared as in Example 1. The inner layer of Mn gradient is firstly coated on the core compound following the procedure of Example 4. The Al gradient layer is then coated on the inner layer through step (b) of "Preparation of NMC powder and surface modification of NMC powder". The above Mn and alumina coated NMC622 cathode material is labeled "E" in the following description.

Figure 8:
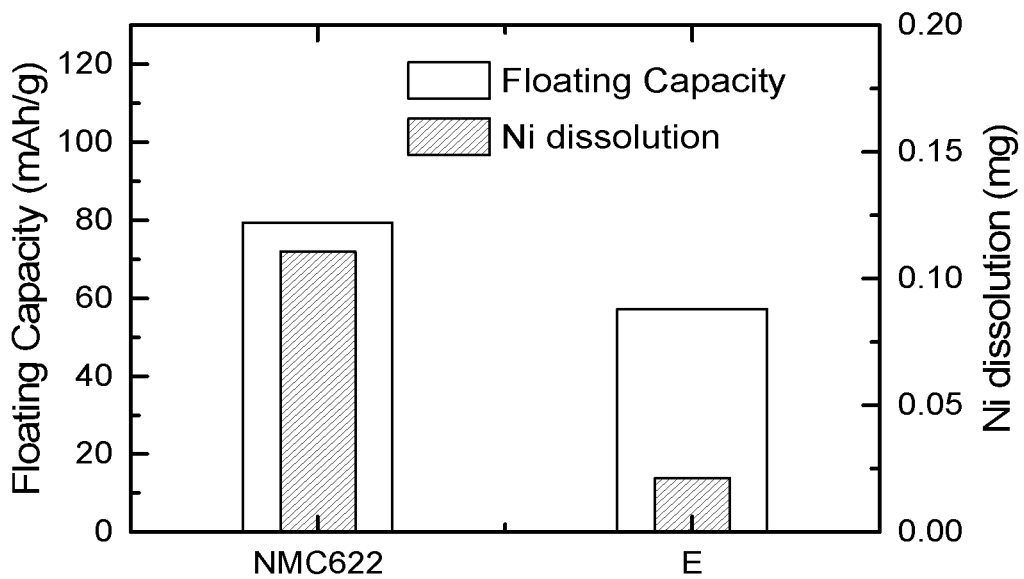
FIG. 8: Floating capacity and Ni dissolution of bare NMC622 and alumina (inner layer) and Mn (outer layer) coated NMC622(E).

FIG. 8 shows the floating test and metal dissolution results of two coin cells, where the positive electrode material is resp. bare NMC622 and "E". The floating results are both obtained by charging the coin cells at 4.6V for 120 hrs at a temperature of 50° C. From the Figure, it is observed that the floating capacity of sample "E" is smaller than that of bare NMC622, and the Ni dissolution is also much reduced in sample "E". When comparing with sample "C", sample "E" also has less dissolved Ni. This confirms the improved high voltage stability of sample "E". Moreover, the Ni dissolution results in sample "D" and sample "E" are quite similar, thus, the sequence of alumina and Mn coating has no big effect on the performance of NMC material at high voltage and temperature. Both the floating test results of samples "D" and "E" prove that the combination of Mn and alumina coating has certain synergetic effects in improving the high voltage stability of NMC622 material at high temperature.

Example 7: Floating Test of Alumina, Mn and LiF Coated NMC622

This Example presents a coated $Li_{1.01}(Ni_{0.6}Mn_{0.2}Co_{0.2})_{0.99}O_2$ cathode material, where the surface layer contains an Al, a Mn and an F gradient according to the present invention, the surface layer being composed of three layers: an Al gradient coating as the inner layer, a Mn gradient coating as the intermediate layer, and an Al and F gradient coating as the outer layer. The core compound $Li_{1.01}(Ni_{0.6}Mn_{0.2}Co_{0.2})_{0.99}O_2$ is prepared as in Example 1. The inner layer of Al gradient is firstly coated on the core compound through step (b), as in Example 2. The Mn gradient layer is then coated on the inner layer following the same procedure as in the Example 4. The Al—F gradient layer is finally coated on the outside of Mn gradient through step (c), as in Example 2 (material "B"). The above alumina, Mn and LiF coated NMC622 cathode material is represent by "F" in the following description.

Figure 9:
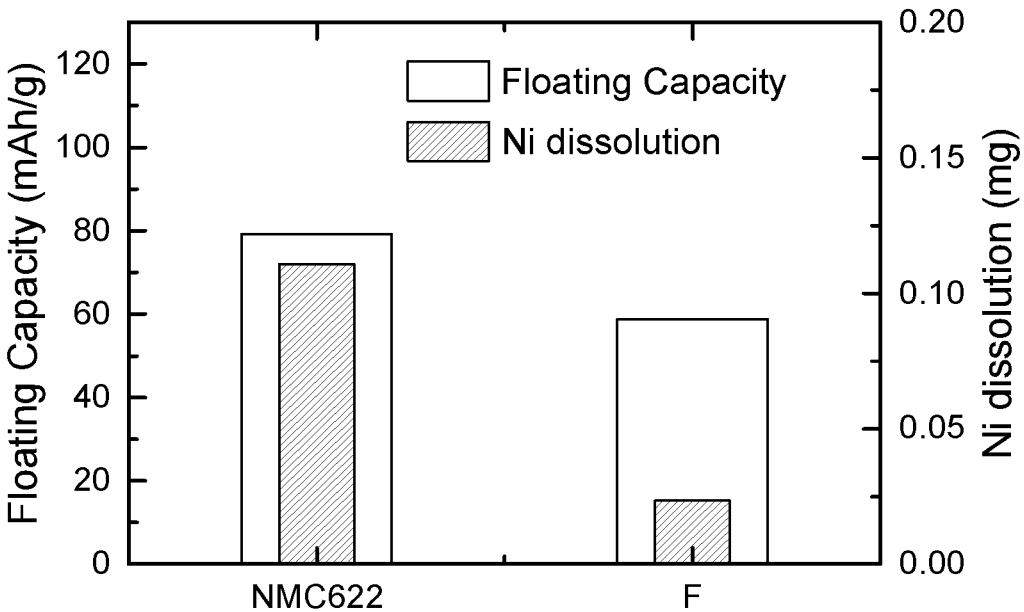
FIG. 9: Floating capacity and Ni dissolution of bare NMC622 and alumina (inner layer), Mn (intermediate layer) and alumina-LiF (outer layer) coated NMC622(F).

FIG. 9 shows the floating test and metal dissolution results of two coin cells, where the positive electrode materials are resp. bare NMC622 and material "F". The floating test results are both obtained by charging the coin cells at 4.6V for 120 hrs at a temperature of 50° C. From the Figure, it is observed that the floating capacity of sample "F" is smaller than that of NMC622, and the Ni dissolution is also much reduced in sample "F". When comparing to sample "C", sample "F" shows an improvement in metal dissolution, where the mass of dissolved Ni is relatively smaller. Thus, the combination of alumina, Mn and LiF coating provides an even more improved stability for NMC622 material at high voltage and temperature than a pure Mn coating. Furthermore, in the Example 4, it is confirmed that the Mn-coated NMC622 has less Ni dissolution than alumina coating (compare FIG. 6 to FIG. 4), therefore, the coating of Mn with alumina and LiF is also more beneficial than solely alumina coating.

Further Conclusions

Figure 10:
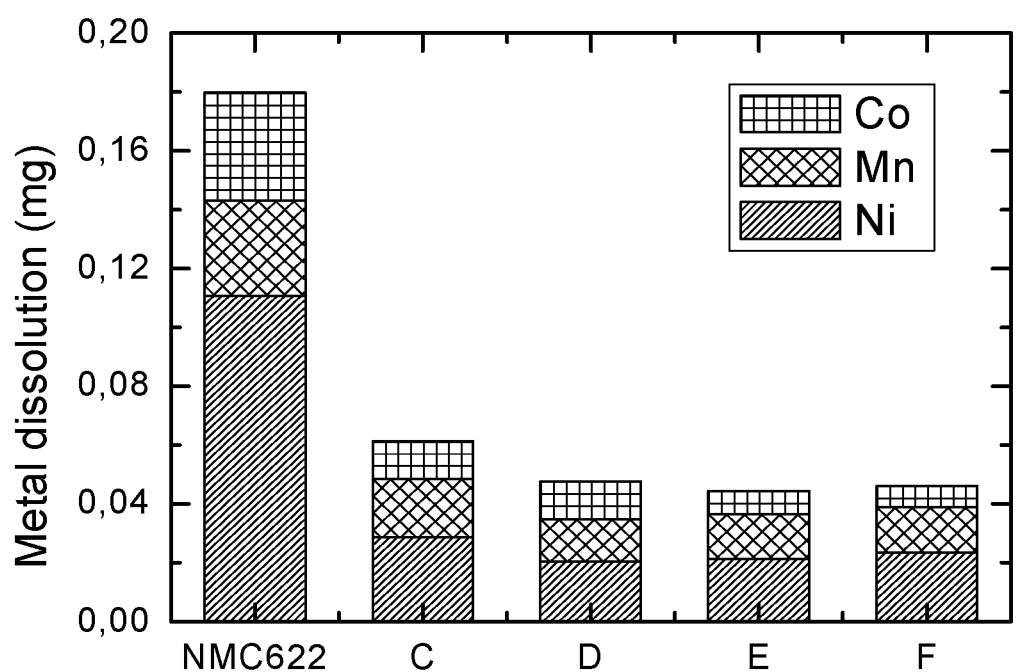
FIG. 10: Metal dissolution of bare NMC622 and surface treated materials according to the invention.

FIG. 10 presents the mass of dissolved Ni, Co and Mn obtained from the floating tests of bare NMC622 and samples "C, "D, "E and "F". From the previous floating test and metal dissolution results, it has been observed that Ni dissolution of NMC622 is reduced with the surface modification of Mn coating and/or alumina coating. In FIG. 10, it is surprisingly found that the Mn dissolution is also reduced in Mn coated NMC622. It was considered that Mn coated NMC622 has a Mn-rich surface layer so that there would be more Mn dissolved during a floating test. However, the floating results in FIG. 10 negates this initial idea. Samples "C", "D", "E" and "F," all coated with a Mn surface layer, have less Mn dissolved than bare NMC622. Thus, the Mn coating also reduces Mn dissolution. t is the same for the Co dissolution. With Mn, with or without alumina coating, there is less Co dissolved during a floating test. Among all the listed samples, the Co dissolution is the least in samples "E and "F which indicates that the combined Mn and alumina coating preferably prevents the Co dissolution. Therefore, from the point of view of metal dissolution, the combination of Mn and alumina coating—with or without LiF coating—presents the best performance, and it is an effective solution to improve the stability of high Ni NMC material at high voltage and temperature charging. Table 1 summarizes the conclusions.

TABLE 1

Summary of Examples 4 to 7

| Sample | Example | Description* | Floating capacity (mAh/g) | ICP of Ni (mg) | ICP of Mn (mg) | ICP of Co (mg) |
|---|---|---|---|---|---|---|
| NMC622 | 4, 5, 6 | (a) | 79.34 | 0.1107 | 0.0323 | 0.0367 |
| C | 4 | (a) + (d) | 58.92 | 0.0288 | 0.0198 | 0.0127 |
| D | 5 | (a) + (b) + (d) | 61.44 | 0.0204 | 0.0145 | 0.0127 |
| E | 6 | (a) + (d) + (b) | 57.25 | 0.0213 | 0.0152 | 0.0079 |
| F | 7 | (a) + (b) + (d) + (c) | 58.81 | 0.0235 | 0.0154 | 0.0072 |

*Description refers to "Preparation of NMC powder and surface modification of NMC powder"

The invention claimed is:

1. A lithium metal oxide powder for use as a cathode material in a rechargeable battery, comprising a core and a surface layer, the core having a layered crystal structure comprising the elements Li, M and oxygen, wherein M has the formula $M=(Ni_z(Ni_{1/2}Mn_{1/2})_yCo_x)_{1-k}A_k$, with $0.15 \leq x \leq 0.30$, $0.20 \leq z \leq 0.55$, $x+y+z=1$ and $0 \leq k \leq 0.1$, wherein A is a dopant, wherein the Li content is stoichiometrically controlled with a molar ratio $0.95 \leq Li:M \leq 1.10$; and wherein the surface layer comprises the elements Li, M' and oxygen, wherein M' has the formula $M'=(Ni_{z'}(Ni_{1/2}Mn_{1/2})_{y'}Co_{x'})_{1-k'}A_{k'}$, with $x'+y'+z'=1$ and $0 \leq k' \leq 0.1$, and wherein $y'/(y+2z') \geq 1.1*[y/(y+2z)]$ and $2x/(y+2z)=2x'/(y'+2z')$, and wherein the surface layer has an outer interface and an inner interface, the inner interface being in contact with the core, and wherein the surface layer has a Mn content that increases continuously from a concentration at the inner interface to a higher concentration at the outer interface, wherein x, y, z and k are measured by ICP and x', y', z' and k' are measured by XPS depth profile.

2. The lithium metal oxide powder of claim 1, wherein the core has a radially constant molar ratio x:y:z.

3. The lithium metal oxide powder of claim 1, wherein the surface layer comprises at least 3 mol % Al, the Al content in the surface layer being determined by XPS.

4. The lithium metal oxide powder of claim 1, wherein the core has an Al content of 0.1-3 mol %, and wherein the surface layer has an Al content that increases from the Al content of the core at the inner interface to at least 10 mol % at the outer interface, the Al content being determined by XPS.

5. The lithium metal oxide powder of claim 1, wherein the surface layer comprises an intimate mixture of elements of the core and nanometric crystalline $Al_2O_3$.

6. The lithium metal oxide powder of claim 1, wherein the core has an F content of less than 0.05 mol %, and the surface layer has an F content that increases from less than 0.05 mol % at the inner interface to at least 3 mol % at the outer interface, the F content being determined by XPS.

7. The lithium metal oxide powder of claim 1, wherein A is one or more of the elements selected from the group consisting of Al, Ti, Mg, W, Zr, Cr and V.

8. The lithium metal oxide powder of claim 1, wherein the surface layer consists of an intimate mixture of elements of the core, LiF and $Al_2O_3$, and one or more compounds selected from the group consisting of $TiO_2$, MgO, $WO_3$, $ZrO_2$, $Cr_2O_3$ and $V_2O_5$.

9. The lithium metal oxide powder of claim 1, wherein $0.15 \leq x \leq 0.25$, $0.20 \leq z \leq 0.40$ and $1 \leq Li:M \leq 1.10$.

10. The lithium metal oxide powder of claim 1, wherein the F content of the core=0 mol %.

11. The lithium metal oxide powder of claim 1, wherein the surface layer has a thickness between 50 nm and 400 nm.

12. The lithium metal oxide powder of claim 1, wherein the surface layer has an outer interface and an inner interface, the inner interface being in contact with the core, and wherein the concentration of Mn at the outer interface is higher than the concentration at the inner interface; wherein the surface layer has an Al content that increases from the Al content of the core at the inner interface to at least 10 mol % at the outer interface; wherein the surface layer has an F content that increases from less than 0.05 mol % at the inner interface to at least 3 mol % at the outer interface, the Al and F content being determined by XPS.

13. The lithium metal oxide powder of claim 12, wherein the molar ratio Mn/Al at the inner interface of the surface layer is smaller than the molar ratio Mn/Al at the outer interface of the surface layer.

14. A method for making the lithium metal oxide powder of claim 1, comprising:
providing a first mixture comprising a lithium M-oxide powder, with $M=(Ni_z(Ni_{1/2}Mn_{1/2})_yCo_x)_{1-k}A_k$, $0.15 \leq x \leq 0.30$, $0.20 \leq z \leq 0.55$, $x+y+z=1$ and $0 \leq k \leq 0.1$, and a first precursor compound comprising Mn,
heating the first mixture to a first sintering temperature between 500° C. and 700° C.,
sintering the first mixture at the first sintering temperature for a first period of time, thereby obtaining the lithium metal oxide powder, and cooling the powder.

15. A method for making the lithium metal oxide powder of claim 3, comprising:
providing a first mixture comprising a lithium M-oxide powder, with $M=(Nit \ (Ni_{1/2}Mn_{1/2})_yCo_x)_{1-k}A_k$, $0.15 \leq x \leq 0.30$, $0.20 \leq z \leq 0.55$, $x+y+z=1$ and $0 \leq k \leq 0.1$, and a first precursor compound comprising Al,
heating the first mixture to a first sintering temperature between 600° C. and 800° C.,
sintering the first mixture at the first sintering temperature for a first period of time,
cooling the first sintered mixture,
adding a second precursor compound comprising Mn to the first sintered mixture, thereby obtaining a second mixture,
heating the second mixture to a second sintering temperature between 500° C. and 700° C.,
sintering the second mixture at the second sintering temperature for a second period of time, thereby obtaining the lithium metal oxide powder, and cooling the powder.

16. A method for making the lithium metal oxide powder of claim 6, comprising:
providing a first mixture comprising a lithium M-oxide powder, with $M=(Ni_z \ (Ni_{1/2}Mn_{1/2})_yCo_x)_{1-k}A_k$, $0.15 \leq x \leq 0.30$, $0.20 \leq z \leq 0.55$, $x+y+z=1$ and $0 \leq k \leq 0.1$, and a first precursor compound comprising Al,
heating the first mixture to a first sintering temperature between 600° C. and 800° C.,
sintering the first mixture at the first sintering temperature for a first period of time,
cooling the first sintered mixture,
adding a second precursor compound comprising Mn to the first sintered mixture, thereby obtaining a second mixture,
heating the second mixture to a second sintering temperature between 500° C. and 700° C.,
sintering the second mixture at the second sintering temperature for a second period of time, thereby obtaining a second sintered mixture, cooling the second sintered mixture, adding a fluorine-containing polymer and a third precursor compound comprising Al to the second sintered mixture, thereby obtaining a third mixture, heating the third mixture to a third sintering temperature between 250° C. and 500° C., sintering the third mixture at the third sintering temperature for a third period of time, thereby obtaining the lithium metal oxide powder, and cooling the powder.

17. A method for making the lithium metal oxide powder of claim 3, comprising:

providing a mixture comprising a lithium M-oxide powder, with $M=(Ni_z(Ni_{1/2}Mn_{1/2})_yCo_x)_{1-k}A_k$, $0.15 \leq x \leq 0.30$, $0.20 \leq z \leq 0.55$, $x+y+z=1$ and $0 \leq k \leq 0.1$, a first precursor compound comprising Mn and a second precursor compound comprising Al, heating the mixture to a sintering temperature between 500° C. and 700° C., sintering the mixture at the sintering temperature for a period of time, and cooling the sintered mixture.

18. The method according to claim 16, wherein the fluorine-containing polymer comprises a PVDF homopolymer, a PVDF copolymer, a PVDF-hexafluoropropylene (HFP) polymer or a PTFE polymer.

19. The lithium metal oxide powder of claim 1, wherein $y'/(y'+2z') \geq 2*[y/(y+2z)]$.

20. The lithium metal oxide powder of claim 1, wherein $z'>0$.

* * * * *